(12) United States Patent
Bhosekar et al.

(10) Patent No.: US 10,815,912 B2
(45) Date of Patent: Oct. 27, 2020

(54) NATURAL GAS FUEL REFORMER CONTROL FOR LEAN BURN GAS ENGINES

(71) Applicant: Caterpillar Inc., Peoria, IL (US)

(72) Inventors: Deepti Bhosekar, Dunlap, IL (US); Venkat Vijay Kishore Turlapati, Peoria, IL (US); Brett A. Zook, Lafayette, IN (US); Andrew J. Loetz, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 498 days.

(21) Appl. No.: 15/225,464

(22) Filed: Aug. 1, 2016

(65) Prior Publication Data

US 2018/0030907 A1 Feb. 1, 2018

(51) Int. Cl.
| | |
|---|---|
| *F02D 19/02* | (2006.01) |
| *F02B 43/04* | (2006.01) |
| *F02B 43/12* | (2006.01) |
| *F02M 21/02* | (2006.01) |
| *F02D 23/00* | (2006.01) |
| *F02D 41/00* | (2006.01) |
| *F02B 43/10* | (2006.01) |

(Continued)

(52) U.S. Cl.
CPC ............ *F02D 19/022* (2013.01); *F02B 29/04* (2013.01); *F02B 43/04* (2013.01); *F02B 43/10* (2013.01); *F02B 43/12* (2013.01); *F02D 19/023* (2013.01); *F02D 23/005* (2013.01); *F02D 41/0027* (2013.01); *F02M 21/0215* (2013.01); *F02M 21/0218* (2013.01); *F02M 31/042* (2013.01); *F01N 2240/30* (2013.01); *F02D 2250/36* (2013.01); *Y02T 10/32* (2013.01)

(58) Field of Classification Search
CPC combination set(s) only.
See application file for complete search history.

(56) References Cited

U.S. PATENT DOCUMENTS

| | | | |
|---|---|---|---|
| 4,119,061 | A | 10/1978 | Toyota |
| 4,131,086 | A | 12/1978 | Nippon Soken |
| 6,739,289 | B2 | 5/2004 | Hiltner et al. |

(Continued)

FOREIGN PATENT DOCUMENTS

| | | |
|---|---|---|
| JP | 2003278570 A | 10/2003 |
| JP | 2008031922 A | 2/2008 |

(Continued)

*Primary Examiner* — Lindsay M Low
*Assistant Examiner* — Ruben Picon-Feliciano
(74) *Attorney, Agent, or Firm* — Miller, Matthias & Hull LLP (57) ABSTRACT

A reformer system may include a reformer device having a fuel inlet, an air inlet and a gas outlet, a first valve set coupled to the fuel inlet and configured to selectively supply a reformer fuel flow from an engine fuel flow to the fuel inlet, a second valve set coupled to the air inlet and configured to selectively supply a reformer air flow from a compressor outlet air flow to the air inlet, and a controller in electrical communication with the first valve set and the second valve set. The controller may determine a target reformer fuel flow based on a target gas flow, determine a target reformer air flow based on the reformer fuel flow and a target air-to-fuel ratio, adjust the reformer fuel flow according to the target reformer fuel flow, and adjust the reformer air flow according to the target reformer air flow.

10 Claims, 5 Drawing Sheets

(51) Int. Cl.
*F02M 31/04* (2006.01)
*F02B 29/04* (2006.01)

(56) References Cited

U.S. PATENT DOCUMENTS

| | | |
|---|---|---|
| 7,028,655 B2 | 4/2006 | Toyota |
| 7,159,541 B2 | 1/2007 | Toyota |
| 7,261,064 B2 | 8/2007 | Bhaisora et al. |
| 7,958,866 B2 | 6/2011 | Thomas |
| 8,677,949 B2 | 3/2014 | Bromberg et al. |
| 2010/0275584 A1* | 11/2010 | Wada ................ B01D 53/9495 60/285 |
| 2014/0109866 A1 | 4/2014 | Gruber et al. |
| 2016/0108862 A1 | 4/2016 | Siuchta et al. |

FOREIGN PATENT DOCUMENTS

| | | |
|---|---|---|
| JP | 2016020645 A | 2/2016 |
| WO | 2011151560 A1 | 12/2011 |

\* cited by examiner

NATURAL GAS FUEL REFORMER CONTROL FOR LEAN BURN GAS ENGINES

TECHNICAL FIELD

The present disclosure relates generally to natural gas engines, and more particularly, to systems and methods for controlling fuel reformers for lean burn gas engines.

BACKGROUND

Natural gas engines, including lean burn gas engines, are widely used for a various applications, such as for natural gas compression, storage, pipeline transmission, and the like. Generally speaking, lean burn gas engines share many similar components of typical combustion engines and operate much like typical internal combustion engines, but employ large amounts of excess air. The excess air absorbs heat during combustion which serves to reduce the combustion temperature and pressure and greatly reduce levels of unwanted pollutants such as Nitrogen Oxides (NOx). Lean burn gas engines also provide longer component life and consume much less fuel, which are particularly beneficial features for applications involving extended amounts of runtime, such as those typical in the natural gas and related industries.

Various regulatory bodies are imposing more stringent emissions regulations for gas engines, and more particularly, for lean burn gas engines. Among other things, there is a common interest within the relevant industries to further reduce NOx levels in the exhaust emissions of lean burn gas engines. One possible solution is to implement a natural gas reformer system, which enriches the fuel with a synthesized hydrogen gas to facilitate leaner burns and lower NOx emission levels. Although fuel reformer systems are not in themselves new, various longstanding challenges have made it difficult to provide a fuel reformer solution that is not only less costly and easier to implement, but also more precisely managed, reliable and effective in reducing NOx emissions.

While there may be various possible configurations to implement a fuel reformer system, all configurations essentially still face the common challenge of reliably maintaining optimum hydrogen levels throughout the operation and life of the associated engine. In one example, U.S. Publication No. 2014/0109866 ("Gruber") discloses an internal combustion engine with a fuel reformer which mixes fuel and air in order to generate hydrogen pre-combustion. However, such conventional systems not only require the addition of complex networks of valves, heaters, coolers and evaporative systems, but are still unable to ensure more precise and reliable control of hydrogen levels and/or the reformer air-to-fuel ratio. Such conventional systems typically lack the means to more accurately monitor and thereby adjust for changes in air, fuel, hydrogen levels and resulting NOx emission levels.

In view of the foregoing disadvantages associated with lean burn gas engines and conventional fuel reformer systems, a need exists for a solution which, not only provides a cost efficient solution for reducing unwanted emissions, but also provides more accurate and reliable techniques for controlling and sustaining desired reformer air-to-fuel ratios in lean burn gas engines. The present disclosure is directed at addressing one or more of the deficiencies and disadvantages set forth above. However, it should be appreciated that the solution of any particular problem is not a limitation on the scope of this disclosure or of the attached claims except to the extent expressly noted.

SUMMARY OF THE DISCLOSURE

In one aspect of the present disclosure, a reformer system for a gas engine is provided. The reformer system may include a reformer device having a fuel inlet, an air inlet and a gas outlet, a first valve set coupled to the fuel inlet and configured to selectively supply a reformer fuel flow from an engine fuel flow to the fuel inlet, a second valve set coupled to the air inlet and configured to selectively supply a reformer air flow from a compressor outlet air flow to the air inlet, and a controller in electrical communication with the first valve set and the second valve set. The controller may be configured to determine a target reformer fuel flow based on a target gas flow, determine a target reformer air flow based on the reformer fuel flow and a target air-to-fuel ratio, adjust the reformer fuel flow according to the target reformer fuel flow, and adjust the reformer air flow according to the target reformer air flow.

In another aspect of the present disclosure, a method of controlling a fuel reformer having a fuel inlet, an air inlet and a gas outlet. The method may include determining a target reformer fuel flow at the fuel inlet based on a target gas flow, determining a target reformer air flow at the air inlet based on a reformer fuel flow at the fuel inlet and a target air-to-fuel ratio, controlling a control valve to adjust the reformer fuel flow at the fuel inlet according to the target reformer fuel flow, controlling a bypass valve and a choke valve to adjust a reformer air flow at the air inlet according to the target reformer air flow, and injecting a gas flow from the gas outlet into a compressor inlet air flow.

In yet another aspect of the present disclosure, a method of controlling a fuel reformer having a fuel inlet, an air inlet and a gas outlet. The method may include determining a target reformer fuel flow at the fuel inlet based on a target gas flow, determining a target reformer air flow at the air inlet based on a reformer fuel flow at the fuel inlet and a target air-to-fuel ratio, controlling a control valve to adjust the reformer fuel flow at the fuel inlet according to the target reformer fuel flow, controlling a choke valve to adjust a reformer air flow at the air inlet according to the target reformer air flow and a pressure difference across the choke valve, and injecting a gas flow from the gas outlet into an aftercooler inlet flow.

These and other aspects and features will be more readily understood when reading the following detailed description in conjunction with the accompanying drawings.

While the following detailed description is given with respect to certain illustrative embodiments, it is to be understood that such embodiments are not to be construed as limiting, but rather the present disclosure is entitled to a scope of protection consistent with all embodiments, modifications, alternative constructions, and equivalents thereto.

DETAILED DESCRIPTION

Figure 1:
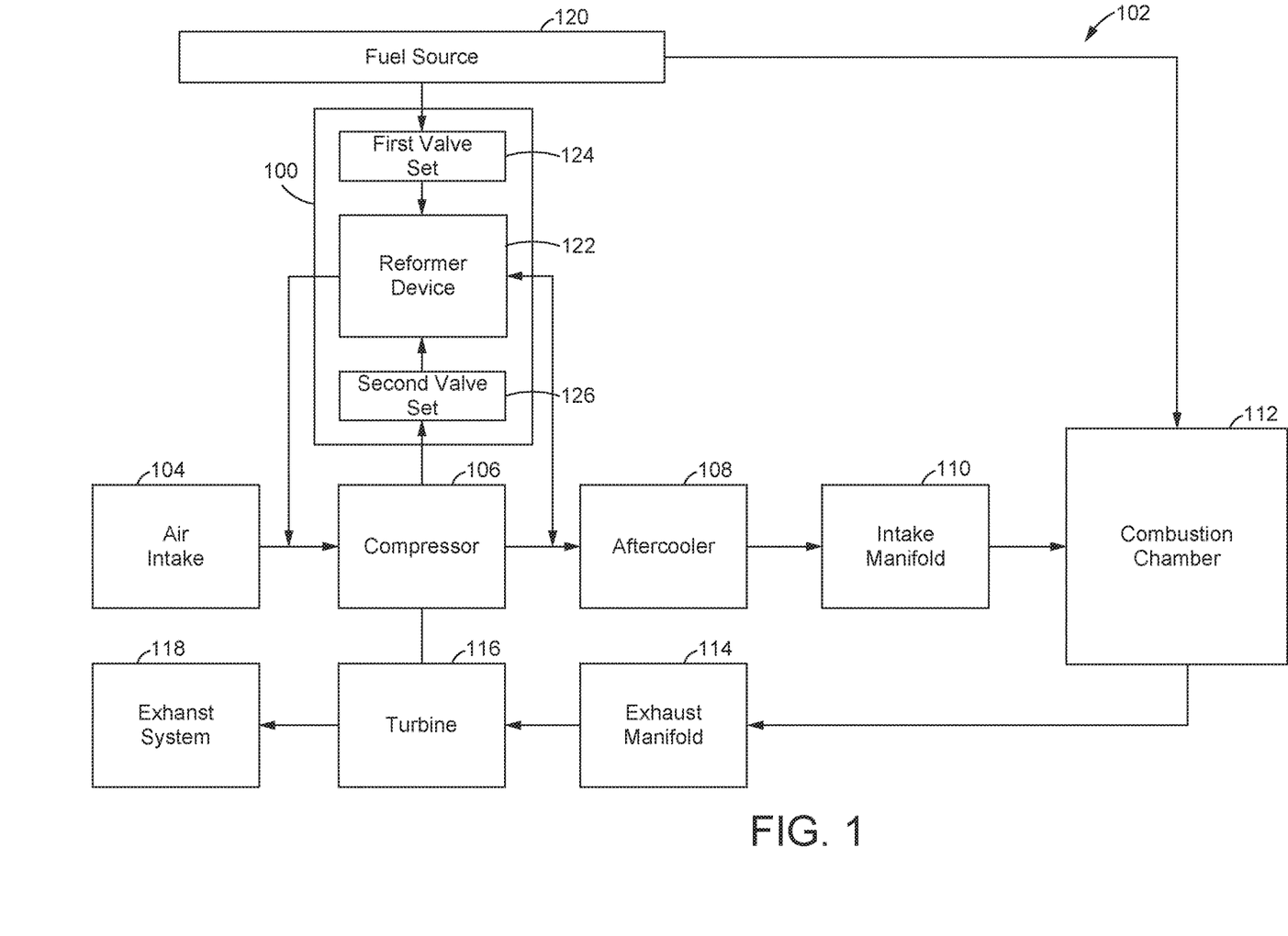
FIG. 1 is a diagrammatic view of one exemplary embodiment of a reformer system for a gas engine constructed in accordance with the present disclosure.

Referring to FIG. 1, one exemplary embodiment of a reformer system 100 for a lean burn gas engine 102 is provided. As shown in the simplified diagram of FIG. 1, the gas engine 102 may include at least an air intake 104, a compressor 106, an aftercooler 108, an intake manifold 110, a combustion chamber 112, an exhaust manifold 114, a turbine 116, an exhaust system 118 and a fuel source 120. More specifically, the air intake 104 may receive filtered ambient air, which is subsequently compressed and cooled through the compressor 106 and the aftercooler 108. The air is then supplied through the intake manifold 110 and subsequently mixed with fuel supplied by the fuel source 120 to be ignited within the combustion chamber 112. Exhaust gases resulting from the combustion are then released through the exhaust manifold 114, the turbine 116 and the exhaust system 118 as shown and as is conventionally understood in the art.

Additionally, the gas engine 102 may be provided with the reformer system 100 of FIG. 1 to introduce synthesized hydrogen gas into the air and fuel mixture prior to combustion, provide leaner burns, and thereby lower Nitrogen Oxide (NOx) emissions. More specifically, the reformer system 100 may include at least a reformer device 122, a first valve set 124 and a second valve set 126. The first valve set 124 may include one or more controllable or actuatable valves configured to direct fuel from the fuel source 120 into the reformer device 122, while the second valve set 126 may include one or more controllable or actuatable valves configured to direct air from an outlet of the compressor 106 into the reformer device 122. Furthermore, the reformer device 122 may be composed of elements necessary to generate or synthesize hydrogen gas based on the mixture of fuel and air provided by the first valve set 124 and the second valve set 126.

Although the reformer system 100 is presented herein for use with lean burn gas engines and for synthesizing hydrogen gas, it will be understood that the reformer system 100 may similarly use, generate and/or introduce other types of gases for different applications. Also, while depicted for use with a lean burn natural gas engine 102, such as those commonly used in association with natural gas compression, storage, pipeline transmission, and the like, it will be understood that the reformer system 100 may be similarly implemented with gas engines associated with vehicles, mobile machinery, stationary machinery, general industrial equipment, or any other suitable application. Furthermore, while the reformer system 100 is disclosed herein for lean burn applications, it will also be understood that the reformer system 100 may similarly be implemented with other types of internal combustion engines.

Figure 2:
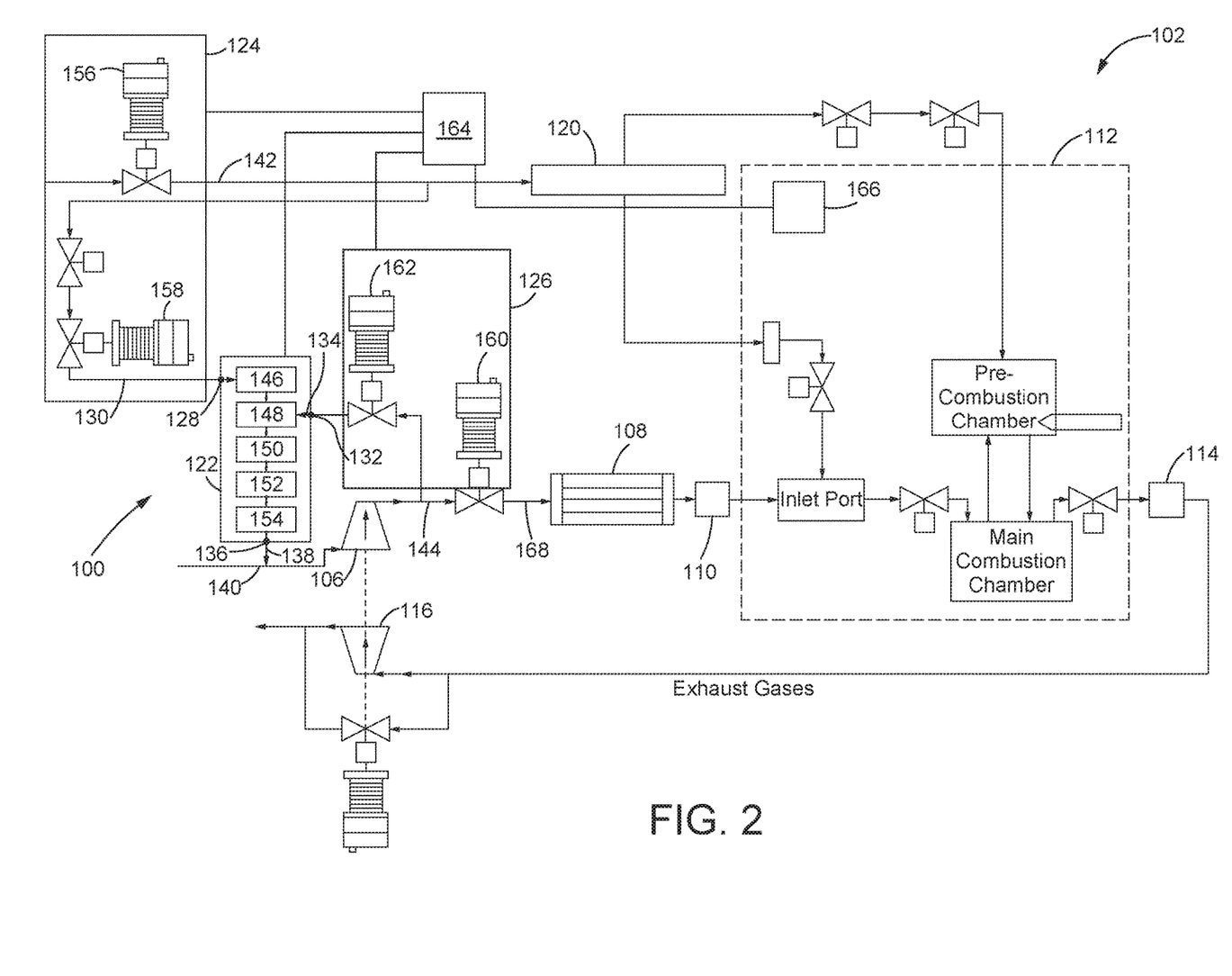
FIG. 2 is a schematic view of an exemplary reformer system employing fuel control and bypass valves for controlling a reformer device.

Turning to FIG. 2, one exemplary embodiment of a reformer system 100 as installed with respect to a lean burn gas engine 102 is provided in more detail. Similar to the generally disclosed embodiment of FIG. 1, the reformer system 100 of FIG. 2 also includes a reformer device 122, a first valve set 124 and a second valve set 126. In particular, the reformer device 122 in FIG. 2 may include a fuel inlet 128 for receiving a reformer fuel flow 130 from the first valve set 124, an air inlet 132 for receiving a reformer air flow 134 from the second valve set 126, and a gas outlet 136 for introducing a gas flow 138, such as hydrogen gas, into the compressor 106 or the compressor inlet air flow 140. Moreover, the first valve set 124 may be coupled to the fuel inlet 128 and configured to selectively supply the reformer fuel flow 130 from an engine fuel flow 142, while the second valve set 126 may be coupled to the air inlet 132 and configured to selectively supply the reformer air flow 134 from a compressor outlet air flow 144.

As shown in FIG. 2, the reformer device 122 may be composed of one or more elements suited to supply or synthesize hydrogen gas based on the received fuel and air mixtures. For example, the reformer device 122 may include one or more of a sulfur trap 146, a mixer 148, a heater element 150, a fuel reformer 152 and a cooler element 154. Specifically, the sulfur trap 146 may be configured to treat the engine fuel flow 142 before the mixer 148 mixes the engine fuel flow 142 with the compressor outlet air flow 144. The heater element 150 may be used to heat the engine fuel flow 142 and compressor outlet air flow 144 mixture, while the fuel reformer 152 produces the gas flow 138, such as hydrogen gas, based thereon. Subsequently, the cooler element 154 may cool the gas flow 138 prior to releasing the gas flow 138 into the compressor inlet air flow 140. The amount of fuel and air that is introduced into the reformer device 122 may be controlled via the first valve set 124 and the second valve set 126.

In particular, as shown in FIG. 2, the first valve set 124 may include a fuel control valve 156 that is in fluid communication with the fuel source 120 and the engine fuel flow 142, and a metering valve 158 configured to selectively communicate the engine fuel flow 142 to the fuel inlet 128 of the reformer device 122. Additionally, the second valve set 126 may include a choke valve 160 fluidly disposed in line along the compressor outlet air flow 144 leading to the aftercooler 108, and a bypass valve 162 configured to selectively communicate the compressor outlet air flow 144 to the air inlet 132 of the reformer device 122. Specifically, the portion of the engine fuel flow 142 that is supplied to the fuel inlet 128 of the reformer device 122 through the metering valve 158 may be designated as the reformer fuel flow 130, and the portion of the compressor outlet air flow 144 that is supplied to the air inlet 132 of the reformer device 122 may be designated as the reformer air flow 134.

Furthermore, the reformer system 100 of FIG. 2 may include a controller 164 that is configured to monitor, manage and control various operations of the reformer system 100. Specifically, the controller 164 may be in electrical and operative communication with at least each of the first valve set 124, the second valve set 126, and any one or more sensor devices 166 associated with the gas engine 102. For example, the controller 164 may monitor and/or adjust the actual reformer fuel flow 130 via control of the fuel control valve 156 and the metering valve 158, as well as monitor and/or adjust the actual reformer air flow 134 via control of the choke valve 160 and the bypass valve 162. The actual reformer fuel flow 130 and/or the actual reformer air flow 134 may be monitored, measured and/or derived using any combination of sensors, venturi devices, and other mechanisms commonly used in the art. The controller 164 may also communicate with the sensor devices 166, such as in-cylinder pressure sensors, burn time sensors, or any other relevant sensor configured to detect or derive parameters that may be useful for controlling the reformer system 100, such as air flow rates or pressures, fuel flow rates or pressures, air-to-fuel ratios (AFRs), burn times within the combustion chamber 112, and the like.

Figure 3:
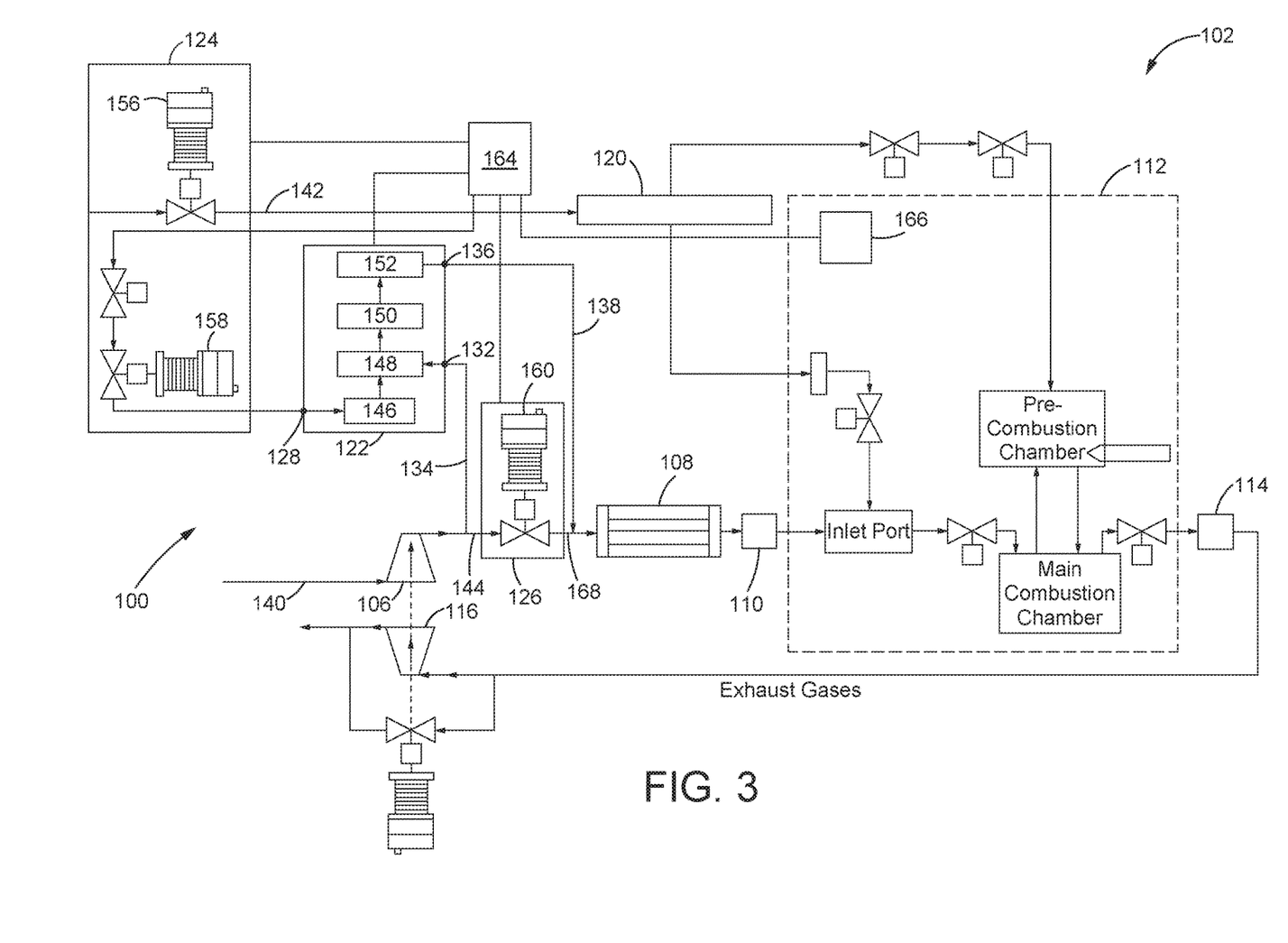
FIG. 3 is a schematic view of an exemplary reformer system employing fuel control and choke valves for controlling a reformer device.

Turning now to FIG. 3, another exemplary embodiment of the reformer system 100 as installed with respect to a lean burn gas engine 102 is provided in detail. Similar to the embodiments of FIGS. 1 and 2, the reformer system 100 of FIG. 3 also includes a reformer device 122, a first valve set 124 and a second valve set 126. The reformer device 122 may similarly include a fuel inlet 128 for receiving the reformer fuel flow 130 from the first valve set 124, and an air inlet 132 for receiving the reformer air flow 134 from the second valve set 126. The first valve set 124 may selectively supply the reformer fuel flow 130 from the engine fuel flow 142, while the second valve set 126 may selectively supply the reformer air flow 134 from a compressor outlet air flow 144. However, unlike in FIG. 2 where the gas outlet 136 introduces a gas flow 138 into the compressor 106 or the compressor inlet air flow 140, the gas outlet 136 of the reformer device 122 in FIG. 3 may be configured to introduce a gas flow 138 into the inlet of the aftercooler 108 or the aftercooler inlet air flow 168.

Additionally, the reformer device 122 of FIG. 3 may include many of the same elements suited to supply or synthesize hydrogen gas based on the received fuel and air mixtures. For example, the reformer device 122 may also include a sulfur trap 146, a mixer 148, a heater element 150 and a fuel reformer 152 as in FIG. 2, but may omit the cooler element 154 of FIG. 2. Furthermore, the amount of fuel and air that is introduced into the reformer device 122 may also be controlled via the first valve set 124 and the second valve set 126, respectively. As in FIG. 2, the first valve set 124 of FIG. 3 may include a fuel control valve 156 that is in fluid communication with the fuel source 120 and the engine fuel flow 142, and a metering valve 158 configured to selectively communicate the engine fuel flow 142 to the fuel inlet 128 of the reformer device 122. However, the second valve set 126 in the embodiment of FIG. 3 may employ a single choke valve 160 and omit the bypass valve 162 of FIG. 2.

As shown in FIG. 3, for example, the single choke valve 160 may remain in line between the compressor outlet air flow 144 and the aftercooler inlet air flow 168 leading to the inlet of the aftercooler 108. However, rather than employing a bypass valve 162 to control the portion of the compressor outlet air flow 144 that is redirected into the air inlet 132 of the reformer device 122, the choke valve 160 controls the compressor outlet air flow 144 into the air inlet 132 based on the pressure differential across the choke valve 160, or the difference in pressure between the compressor outlet air flow 144 and the aftercooler inlet air flow 168. Again, the portion of the engine fuel flow 142 that is supplied to the fuel inlet 128 of the reformer device 122 through the metering valve 158 may be designated as the reformer fuel flow 130, and the portion of the compressor outlet air flow 144 that is supplied to the air inlet 132 of the reformer device 122 may be designated as the reformer air flow 134.

Also, as in FIG. 2, the reformer system 100 of FIG. 3 may include a controller 164 configured to monitor, manage and control various operations of the reformer system 100. Specifically, the controller 164 may be in electrical and operative communication with at least each of the first valve set 124, the second valve set 126, and any one or more sensor devices 166 associated with the gas engine 102. For instance, the controller 164 may monitor and/or adjust the reformer fuel flow 130 via control of the fuel control valve 156 and the metering valve 158, as well as monitor and/or adjust the reformer air flow 134 via control of the choke valve 160 and the pressure difference thereacross. Again, the actual reformer fuel flow 130 and/or the actual reformer air flow 134 may be monitored, measured and/or derived using any combination of sensors, venturi devices, and other mechanisms commonly used in the art. The controller 164 may also communicate with the sensor devices 166, such as in-cylinder pressure sensors, burn time sensors, or any other suitable sensor configured to detect or derive parameters relevant to the reformer system 100, such as air flow rates or pressures, fuel flow raters or pressures, air-to-fuel ratios (AFRs), burn times within the combustion chamber 112, and the like.

Figure 4:
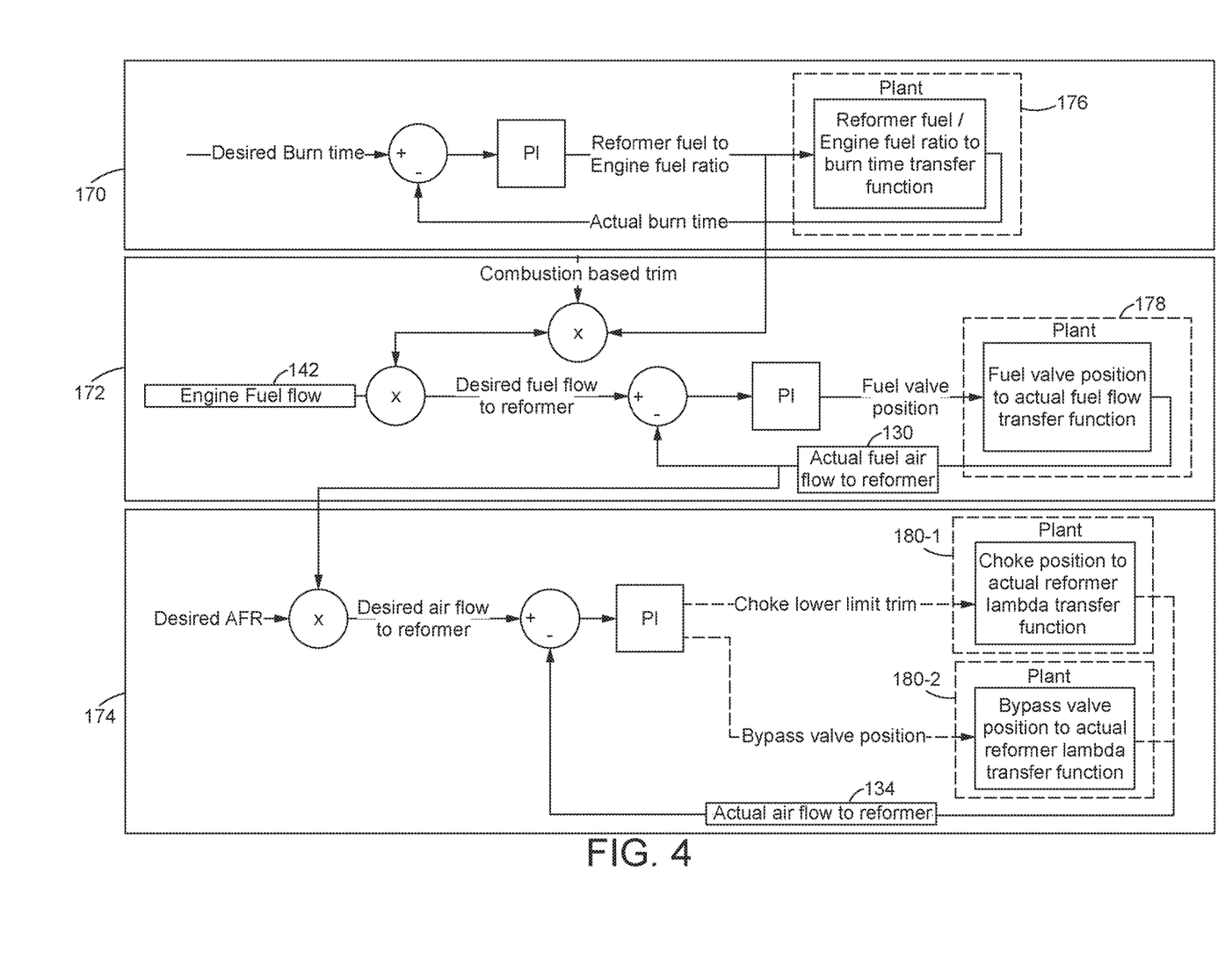
FIG. 4 is a diagrammatic view of the control logic performed by one exemplary controller of a reformer system.

Referring now to FIG. 4, exemplary embodiments of control schemes for operating the controller 164 of the reformer system 100 is diagrammatically provided. Specifically, the controller 164 may be implemented using one or more of a processor, a microprocessor, a microcontroller, an electronic control module (ECM), an electronic control unit (ECU), and any other suitable device for communicating with any one or more of first valve set 124, the second valve set 126, the sensor devices 166, and the like. The controller 164 may be configured to operate according to preprogrammed algorithms or sets of logic instructions which correspond to or function in accordance with one or more control schemes. As shown in FIG. 4 for example, the controller 164 may be programmed to operate and control the reformer system 100 according to at least an assessment control scheme 170, a fuel flow control scheme 172 and an air flow control scheme 174.

The assessment control scheme 170 shown in FIG. 4 generally serves to achieve and maintain combustion chamber burn times that would be best suited for producing the desired amount of the synthesized gas or the target gas flow. To initially determine the target gas flow, the controller 164 and/or the assessment control scheme 170 may refer to one or more predetermined relationships between target gas flows and corresponding NOx levels, which may be theoretically obtained or acquired through earlier testing, and arranged in the form of lookup tables, maps, models, or the like. For instance, if the desired NOx level in a given application is approximately 50 ppm or lower, the predetermined relationships may suggest that the corresponding target hydrogen gas flow to the combustion chamber 112 should be approximately 5% or more. Once the target gas flow is known, the assessment control scheme 170 may then determine the combustion chamber burn time needed to effectuate the target gas flow.

Based on the determined target gas flow, the assessment control scheme 170 of FIG. 4 may reference additional predetermined relationships or models in order to further translate the target gas flow into corresponding burn times. Again, such predetermined relationships may relate different burn times to different levels of target gas flow, and may be based on theoretically obtained or previously tested data arranged in the form of lookup tables, maps, models, or the like. Once the target burn time for the given application is known, the assessment control scheme 170 may proceed to controlling the reformer system 100 as shown. For example, the assessment control scheme 170 may monitor the actual burn time based on one or more of the sensor devices 166, compare the actual burn time to the target burn time, and make corrections to the burn time through a transfer function or a catalyst control plant 176 which relates burn time adjustments to a target reformer-to-engine fuel ratio, or the desired ratio between reformer fuel flow 130 and engine fuel flow 142.

As further shown in FIG. 4, the target reformer-to-engine fuel ratio indicated by the assessment control scheme 170 may be used by the fuel flow control scheme 172 to adjust the reformer fuel flow 130 supplied to the reformer device 122. For example, the fuel flow control scheme 172 may apply the actual engine fuel flow 142 to the target reformer-to-engine fuel ratio to determine the target reformer fuel flow for the given iteration. In one example, the target reformer fuel flow may be defined as a fixed percentage of the engine fuel flow 142, such as where the engine fuel flow 142 ranges approximately between 32 MN and 85 MN and the target gas flow ranges approximately between 0-5% hydrogen. The fuel flow control scheme 172 may additionally monitor or track engine combustion stability, and actively adjust reformer fuel flow based on any significant changes in the engine combustion stability. In particular, the fuel flow control scheme 172 may apply a combustion based trim, or some other adjustment, to the target reformer-to-engine fuel ratio, where the combustion based trim corresponds to one or more factors or parameters indicative of engine combustion stability. The fuel flow control scheme 172 may also determine adjustments necessary to correct for deviations between the actual reformer fuel flow 130 and the target reformer fuel flow. For example, the fuel flow control scheme 172 may apply a transfer function or a fuel control plant 178 relating reformer fuel flow 130 to the first valve set 124 or the fuel control valve 156. The difference between the target reformer fuel flow and the actual reformer fuel flow 130 may be used to output a fuel valve position command, or the like, which controls the fuel control valve 156 and appropriately corrects the reformer fuel flow 130.

Also, the air flow control scheme 174 of FIG. 4 may be configured to adjust or correct the reformer air flow 134 according to a target air-to-fuel ratio (AFR). Initially, the air flow control scheme 174 may apply a predefined target AFR to the actual reformer fuel flow 130 as assessed in the fuel flow control scheme 172 to determine the target reformer air flow. The target reformer air flow may then be compared to the actual reformer air flow 134 to determine the appropriate adjustments to the second valve set 126. For instance, using a transfer function or a first air control plant 180-1 that is based on the reformer system 100 of FIG. 2, the air flow control scheme 174 may generate a bypass valve position command which controls the bypass valve 162 and corrects for deviations. If, however, using a transfer function or a second air control plant 180-2 based on the reformer system 100 of FIG. 3, the air flow control scheme 174 may determine a choke valve limit command which adjusts the lower limit of the choke valve 160 and corrects for deviations.

Accordingly, the assessment control scheme 170, the fuel flow control scheme 172, and the air flow control scheme 174 may collectively program or configure the controller 164 to at least determine a target reformer fuel flow based on a target gas flow, determine a target reformer air flow based on the reformer fuel flow 130 and a target AFR, adjust the reformer fuel flow 130 according to the target reformer fuel flow, and adjust the reformer air flow 134 according to the target reformer air flow. Moreover, the controller 164 may enable the reformer system 100 to adjust the amount of fuel and air entering the reformer device 122 in a manner that optimizes combustion chamber burn time and hydrogen output, and thereby efficiently reduces NOx emission levels.

INDUSTRIAL APPLICABILITY

In general, the present disclosure finds utility in various applications, such as for natural gas compression, storage, pipeline transmission, and other applications related to the natural gas industry, and more particularly, provides a solution to a problem common to conventional natural gas engines or lean burn gas engines. Many of the concepts disclosed herein may also be similarly applied to other types of internal combustion engines. Specifically, the present disclosure provides a fuel reformer solution which controls hydrogen gas production based on close monitoring of the combustion chamber burn time, the reformer fuel flow and the reformer air flow. By using existing sensors and individual control of reformer fuel flow and reformer air flow, the present application provides a simplified and cost-effective solution for reducing NOx emissions that is also more accurate than conventional fuel reformers.

Figure 5:
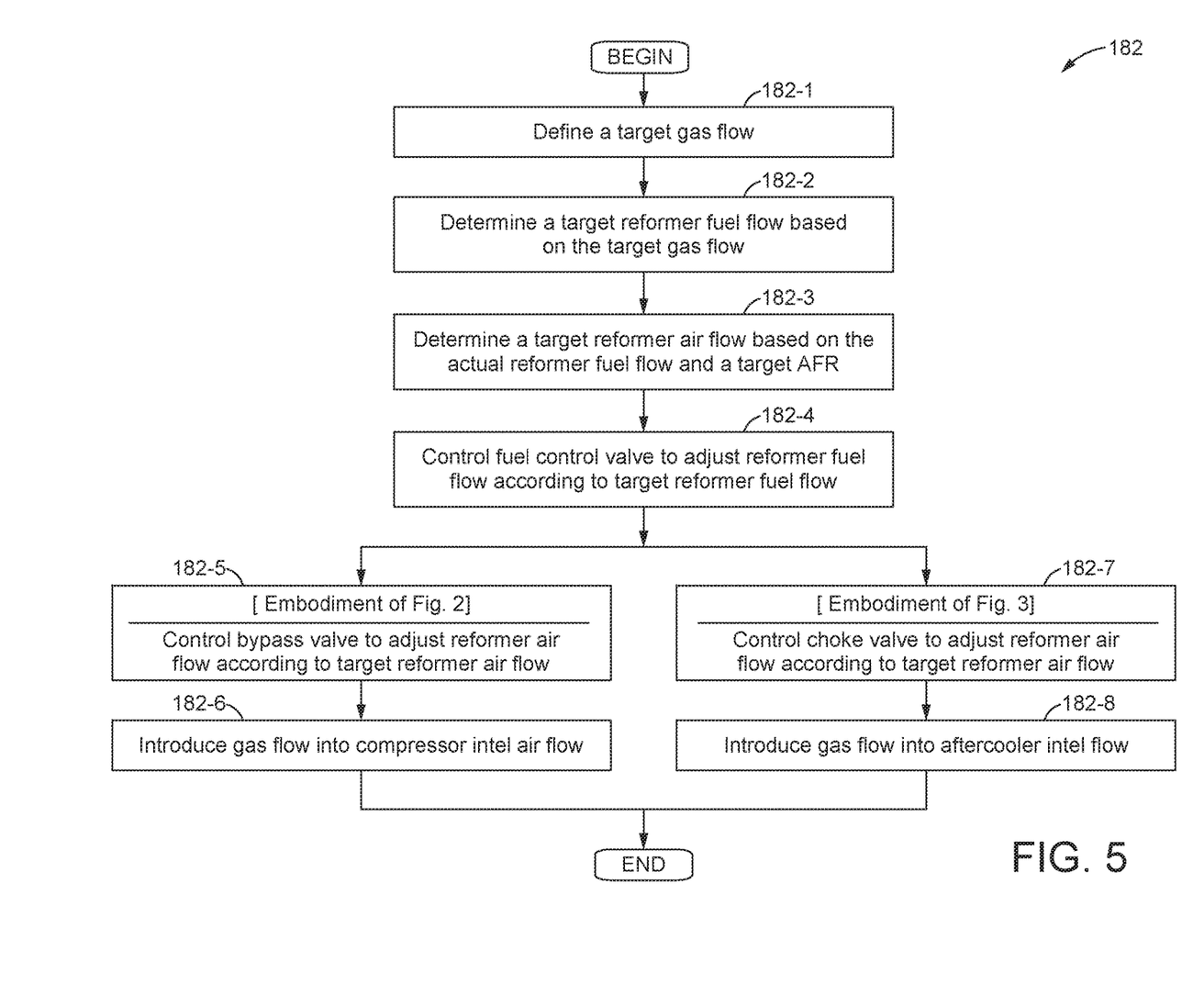
FIG. 5 is a flow diagram of one exemplary algorithm or method of controlling a fuel reformer.

Turning now to FIG. 5, one exemplary algorithm or method 182 of controlling a fuel reformer system 100 for a gas engine 102 is provided. In particular, the method 182 may be implemented in the form of one or more algorithms, instructions, logic operations, or the like, and the individual processes thereof may be performed or initiated via the controller 164. As shown in block 182-1, the method 182 may initially include defining a target gas flow, such as the desired amount of hydrogen gas to be synthesized and included in the combustion. Similar to the assessment control scheme 170 in FIG. 4, the target gas flow may be defined by reference to one or more predetermined relationships or models between target gas flows and corresponding NOx levels. If, for example, the desired NOx level in a given application is approximately 50 ppm or less, the predetermined relationships or models may suggest that the corresponding target hydrogen gas flow to the combustion chamber 112 should be approximately 5% or more.

Based on the target gas flow, the method 182 of FIG. 5 may be configured to determine a target reformer fuel flow in block 182-2. While there may be several ways to derive the target reformer fuel flow from the target gas flow, one technique may be to use the target gas flow to derive a corresponding combustion chamber burn time, which may then be used to derive a target reformer-to-engine fuel ratio, as disclosed with respect to the assessment control scheme 170 of FIG. 4. The target reformer fuel flow may then be derived by comparing or multiplying the target reformer-to-engine fuel ratio to the actual engine fuel flow 142, as disclosed for example in the fuel flow control scheme 172 of FIG. 4. Furthermore, according to block 182-3 of FIG. 5, the method 182 may then determine the target reformer air flow based on the actual reformer fuel flow 130 and a target air-to-fuel ratio. More specifically, the target AFR, which may be a predefined value, is multiplied to the actual reformer fuel flow 130 to determine the target reformer air flow, as disclosed for example by the air flow control scheme 174 of FIG. 4.

In addition, once the target reformer fuel flow has been determined, the method 182 in block 182-4 of FIG. 5 may initiate control of the first valve set 124, such as the fuel control valve 156 of FIGS. 2 and 3, as needed to adjust the reformer fuel flow 130 to the target reformer fuel flow. As disclosed in the fuel flow control scheme 172 of FIG. 4, the method 182 may control or adjust the fuel valve position of the fuel control valve 156 until there is minimum or acceptable deviation between the target reformer fuel flow and the reformer fuel flow 130. Furthermore, once the target reformer air flow is known, the method 182 may similarly initiate control of the second valve set 126 of the reformer system 100 to adjust or correct the reformer air flow 134 according to the target reformer air flow. Moreover, as shown in FIG. 5, the method 182 may control the second valve set 126 differently depending on the configuration of the second valve set 126 or the type of valves provided.

If the second valve set 126 includes a choke valve 160 and a bypass valve 162, such as in the configuration shown in FIG. 2, the method 182 may follow block 182-5 of FIG. 5 to control the reformer air flow 134. Specifically, the method 182 may control the bypass valve 162 or adjust the bypass valve position to correct for deviations with the target reformer air flow. In accordance with the embodiment of FIG. 2 then, the method 182 in block 182-6 thereby introduces gas flow 138, such as hydrogen gas, into the compressor inlet air flow 140. If, however, the second valve set 126 of FIG. 3 is used, which employs a single choke valve 160, the method 182 may follow block 182-7 and control the lower limit of the choke valve 160. For example, the method 182 may include increasing or decreasing the lower limit of the choke valve 160 to correspondingly adjust the reformer air flow 134 according to the target reformer air flow. The method 182 in block 182-8 thereby introduces gas flow 138, such as hydrogen gas, into the aftercooler inlet air flow 168 according to the embodiment of FIG. 3.

While the processes of the method 182 of FIG. 5 may have some sequential order of operation, it will be understood that any two or more of the processes may alternatively be performed in sequences other than as specifically shown and/or performed simultaneously with one another. Furthermore, any one or more of the processes within the method 182 may be reiteratively performed during operation of the associated gas engine 102, and at varying reiterative frequencies depending on the desired degree of sensitivity. From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A reformer system for a gas engine, comprising:
    a reformer device producing a hydrogen gas flow, the reformer device having a fuel inlet, an air inlet and a gas outlet, the gas outlet configured to direct the hydrogen gas flow to an intake manifold of the gas engine;
    a first valve set coupled to the fuel inlet and configured to selectively supply a reformer fuel flow from an engine fuel flow to the fuel inlet;
    a second valve set coupled to the air inlet and configured to selectively supply a reformer air flow from a compressor outlet air flow to the air inlet;
    a burn time sensor to determine actual burn times in a combustion chamber of the gas engine; and
    a controller in electrical communication with the first valve set, the second valve set, and the burn time sensor, the controller being configured to:
        determine a reformer fuel-to-engine fuel ratio based on a comparison between actual burn times and target burn times,
        control the first valve set to adjust the reformer fuel flow according to a target reformer fuel flow, the target reformer fuel flow being based on the determined reformer fuel-to-engine fuel ratio and the engine fuel flow,
        determine a target reformer air flow based on the adjusted reformer fuel flow, and
        control the second valve set to adjust the reformer air flow according to the target reformer air flow.

2. The reformer system of claim 1, wherein the reformer device includes one or more of a sulfur trap configured to treat the engine fuel flow, a mixer configured to mix the engine fuel flow and the compressor outlet air flow, a heater configured to heat the engine fuel flow and the compressor outlet air flow, a fuel reformer configured to produce the hydrogen gas flow from the engine fuel flow and the compressor outlet air flow, and a cooler configured to cool the hydrogen gas flow.

3. The reformer system of claim 1, wherein the first valve set includes one or more of control valves, metering valves, bypass valves and choke valves configured to control the reformer fuel flow at the fuel inlet of the reformer device based on the engine fuel flow and the target reformer fuel flow.

4. The reformer system of claim 1, wherein the second valve set includes a choke valve and a bypass valve, the choke valve coupling a compressor outlet to an aftercooler inlet, the bypass valve coupling the compressor outlet to the air inlet of the reformer device, and the gas outlet of the reformer device coupling the hydrogen gas flow from the gas outlet into a compressor inlet.

5. The reformer system of claim 4, wherein the choke valve is configured to control the compressor outlet air flow from the compressor outlet to the aftercooler inlet, the bypass valve is configured to control the compressor outlet air flow from the compressor outlet to the air inlet of the reformer device based on the target reformer air flow.

6. The reformer system of claim 1, wherein the second valve set includes a choke valve in fluid communication with each of a compressor outlet, an aftercooler inlet and the air inlet of the reformer device, and the gas outlet of the reformer device coupling the hydrogen gas flow from the gas outlet into an aftercooler inlet.

7. The reformer system of claim 6, wherein the choke valve is configured to control the compressor outlet air flow from the compressor outlet to the aftercooler inlet, and control the compressor outlet air flow from the compressor outlet to the air inlet of the reformer device based on the target reformer air flow and a pressure differential between the compressor outlet and the aftercooler inlet.

8. The reformer system of claim 1, wherein the controller is configured to determine the target reformer fuel flow based on a fixed percentage of the engine fuel flow that is further based on a target gas flow, the engine fuel flow ranging approximately between 32 MN and 85 MN, and the target gas flow ranging approximately between 0-5% hydrogen.

9. The reformer system of claim 1, wherein the controller is configured to control the first valve set based on a difference between the target reformer fuel flow and the reformer fuel flow, and control the second valve set based on a difference between the target reformer air flow and the reformer air flow.

10. The reformer system of claim 1, wherein the controller is configured to derive the target burn times based on a target gas flow, and determine the target reformer fuel flow based on differences between the target burn times and actual burn times.

* * * * *